US008660987B2

(12) United States Patent
Chellappa et al.

(10) Patent No.: US 8,660,987 B2
(45) Date of Patent: Feb. 25, 2014

(54) DATA CACHE TECHNIQUES IN SUPPORT OF SYNCHRONIZATION OF DATABASES IN A DISTRIBUTED ENVIRONMENT

(75) Inventors: Balaji Chellappa, Stamford, CT (US); Sayee Natarajan, Norwalk, CT (US)

(73) Assignee: Purdue Pharma L.P., Stamford, CT (US)

(*) Notice: Subject to any disclaimer, the term of this patent is extended or adjusted under 35 U.S.C. 154(b) by 0 days.

(21) Appl. No.: 13/461,238

(22) Filed: May 1, 2012

(65) Prior Publication Data

US 2012/0215739 A1    Aug. 23, 2012

Related U.S. Application Data

(62) Division of application No. 11/925,585, filed on Oct. 26, 2007, now Pat. No. 8,195,605.

(60) Provisional application No. 60/863,243, filed on Oct. 27, 2006, provisional application No. 60/867,943, filed on Nov. 30, 2006.

(51) Int. Cl.
*G06F 17/30* (2006.01)

(52) U.S. Cl.
USPC ............................................ 707/609; 707/610

(58) Field of Classification Search
None
See application file for complete search history.

(56) References Cited

U.S. PATENT DOCUMENTS

| | | | |
|---|---|---|---|
| 6,185,608 B1 * | 2/2001 | Hon et al. | 709/216 |
| 6,324,693 B1 | 11/2001 | Brodersen et al. | |
| 6,741,997 B1 | 5/2004 | Liu et al. | |
| 7,139,780 B2 | 11/2006 | Lee et al. | |
| 7,310,653 B2 * | 12/2007 | Coyle et al. | 1/1 |
| 7,346,616 B2 | 3/2008 | Ramenujam et al. | |
| 7,415,486 B2 | 8/2008 | Muller | |
| 7,953,698 B2 | 5/2011 | Beck et al. | |
| 7,979,390 B2 | 7/2011 | Chellappa | |
| 8,027,858 B2 | 9/2011 | Aleksiejczyk | |
| 8,032,402 B2 | 10/2011 | Aleksiejczyk | |
| 2003/0065738 A1 | 4/2003 | Yang et al. | |
| 2006/0282521 A1 | 12/2006 | Anderson et al. | |
| 2008/0103821 A1 | 5/2008 | Cerbone | |
| 2008/0103822 A1 | 5/2008 | Arora | |
| 2008/0104613 A1 | 5/2008 | Ciszkowski | |

FOREIGN PATENT DOCUMENTS

WO    WO 2004036464    4/2004

* cited by examiner

*Primary Examiner* — Hung Q Pham
(74) *Attorney, Agent, or Firm* — Leason Ellis LLP (57) ABSTRACT

A method for synchronizing a database server to a current status of a client database using data cache techniques is provided. Upon initiating synchronization, the database server receives an identification of a client connection, and creates a server-cache-table having a structure that is compatible with the client database. Database records from a corresponding client-cache-table are received through the client connection and inserted into the server-cache-table. The server-cache-table is merged into the database server. Similar cache-tables can be utilized to synchronize data from the database server to the client. Optionally, a parent-cache-table can be created on the server and populated with records associated with the identified client. Queries and other database operations during synchronization can be performed over the parent-cache-table to further optimize performance.

16 Claims, 4 Drawing Sheets

DATA CACHE TECHNIQUES IN SUPPORT OF SYNCHRONIZATION OF DATABASES IN A DISTRIBUTED ENVIRONMENT

This patent application is a divisional application of U.S. application Ser. No. 11/925,585, filed Oct. 27, 2007 which claims the benefit of priority under 35 U.S.C. §119(c) of U.S. Application Ser. No. 60/867,943, filed Nov. 30, 2006, entitled "Data Cache Techniques in Support of Synchronization of Databases in a Distributed Environment," and of U.S. Application Ser. No. 60/863,243, filed Oct. 27, 2006, entitled "Territory Management System," which are hereby incorporated by reference in their respective entireties.

FIELD OF THE INVENTION

The present invention relates to the synchronization of databases in a distributed environment, and, more particularly, to software systems and methodologies that optimize database synchronization through the use of data cache techniques.

BACKGROUND OF THE INVENTION

In many sectors, field representatives are used to educate customers and potential customers on the products of manufacturers and service providers. In the course of their duties, sales representatives make site visits and build a relationship with the customers and potential customers in their assigned territory. Typically, field representatives maintain records of their visits in accordance with any guidelines or requirements of the companies that they represent. The records of site visits can include details and have formats that vary widely among representatives and the companies they represent. The data collected by field representatives is typically aggregated in a centralized repository such as a database server so that the data can be analyzed. Additionally, the centralized repository commonly redistributes information or provides additional information, such as analysis of the data, to the field representatives. This data collection and distribution is typically performed using a client-server database architecture.

As the number of field representatives increases, the performance and scalability of typical client-server database models can degrade, and in some cases render the system inoperable. These performance issues are especially problematic when multiple clients simultaneously attempt to synchronize with the server. Multiple simultaneous client connections are common in environments in which clients synchronize during their "down-time" (e.g., overnight, when the user is not visiting sites and entering data), because users typically have similar schedules.

The performance and scalability degradation results from several factors. In a client-server model, database query optimizers do not predictably perform transactions on the client or the server. This can result in a great discrepancy in the amount of data transmitted over the network compared to the amount of data that is actually required to be modified or added. For example, during synchronization, the client may need to insert only a few new records into the tables on the database server. However, rather than transmitting the few records from the client to the server, the server may transmit the entire table to the client, perform the insertion on the client, and then transmit the table back to the server. Such a transaction greatly increases the quantity of data transmitted over the network, and can lock the entire database server until the transaction is complete, thereby preventing another client from synchronizing at the same time.

Some systems have attempted to address this problem by creating additional infrastructure external to the client-server database. For example, the synchronizing machine can create a queue into which the new or modified records are inserted. The queue is then processed by transmitting each record to the other machine where it is processed. This approach is limited by the additional processing time that is required during execution because it is built on-top-of the database and because it requires sequential processing of the queue rather than taking advantage of the built-in services of the database.

The present invention addresses these deficiencies in the art and provides other improvements useful to the synchronization of client-server databases.

SUMMARY OF THE INVENTION

In accordance with one aspect of the present invention, a method for synchronizing databases is provided over a communication connection that is established between a database server and a client. A client-cache-table is created on the client having one more fields corresponding to at least one field in the client database. The client-cache-table is populated with at least one database record in accordance with a synchronization criterion. A server-cache-table is also created on the database server, such that the server-cache-table has one or more fields corresponding to at least one field in the client-cache-table. At least one record in the populated client-cache-table is inserted into the server-cache-table, and the server-cache-table is merged into the database server.

In accordance with a further aspect of the present invention, the databases of a client and a database server can be synchronized. A communication connection between the database server and the client is established and the client is identified to the database server. A client-cache-table is created on the client and at least one database records from a results-cache-table on the database server is inserted into the client-cache-table. The client-cache-table is then merged into the client database.

In accordance with yet a further aspect of the present invention, the tables on the database server include at least one parent table and associated child tables. The parent table and associated child tables are populated with database records that are associated with at least one client. A parent-cache-table is created on the server for at least one of the parent tables and is associated with the client. The parent-cache-table is populated with at least one of the database records associated with the client. Furthermore, the results-cache-table is populated with at least one database record from the parent-cache-table and associated child tables. Optionally, the database records that populate the results-cache-table further satisfy a synchronization criterion.

These and other aspects, features, and advantages will be apparent from the following description of certain embodiments and the accompanying drawing figures.

DETAILED DESCRIPTION OF CERTAIN EMBODIMENTS

By way of overview and introduction, the present invention is discussed below with respect to a territory management system that provides representatives with a tool for conducting their activities in an efficient manner. Such a territory management tool typically requires synchronization of a central database with one or more client databases owned and operated by the field representatives. Furthermore, the client database frequently requires synchronization with information created and stored on the database server, or uploaded to the database server during the synchronization of a different client.

The management system is preferably implemented as a software-based system, having components executing on a number of systems including a central computer and a multiplicity of remote machines, with each representative having a remote machine for his or her personal use and for forwarding adverse event information to a location associated with or accessible by the central computer. Without loss of generality, the present invention is described in relation to a particular representative using a single remote machine in the course of his or her activities covering an assigned territory. In the preferred embodiment described below, the representative is bespoke or contracted to a pharmaceutical manufacturer, and the representative "covers" a territory through visits to health care providers ("HCPs"), physicians and nurses (collectively, more generally, "prescribers") at which the representative is able to discuss and promote the use of the manufacturer's products. However, the invention has industrial applicability in other sectors including in connection with field representative activities in promoting products and services of general nature, including, without limitation, in the medical device sector.

A preferred software tool for territory management is described in part in the aforesaid U.S. Provisional Application Ser. No. 60/863,243, entitled "Territory Management System." The Territory Management System software provides through a Web-browser interface a number of tools that assist the representative in planning, recording, and tracking activities with customers such as prescribers. In relevant part, the Territory Management System software can assist a representative with managing, processing and deciphering sales information following their efforts in servicing his or her assigned territory. The Territory Management System software includes additional features that can assist representatives in other ways, such as in complying with concerning certain regulatory requirements or state or federal constraints concerning gifts to health care professionals, in reducing discrepancies in sample inventories as between stored and on-hand inventories, and in scheduling site visits to HCPs. Various features of the Territory Management System software are described in certain co-pending provisional patent applications which are referenced below, to the extent they have pertinence to the discussion of the present invention.

The remote machine used by the representative includes a suitable complement of hardware and software including, by way of example, a processor, memory, an accessible database, communications equipment, and input/output devices.

Figure 1:
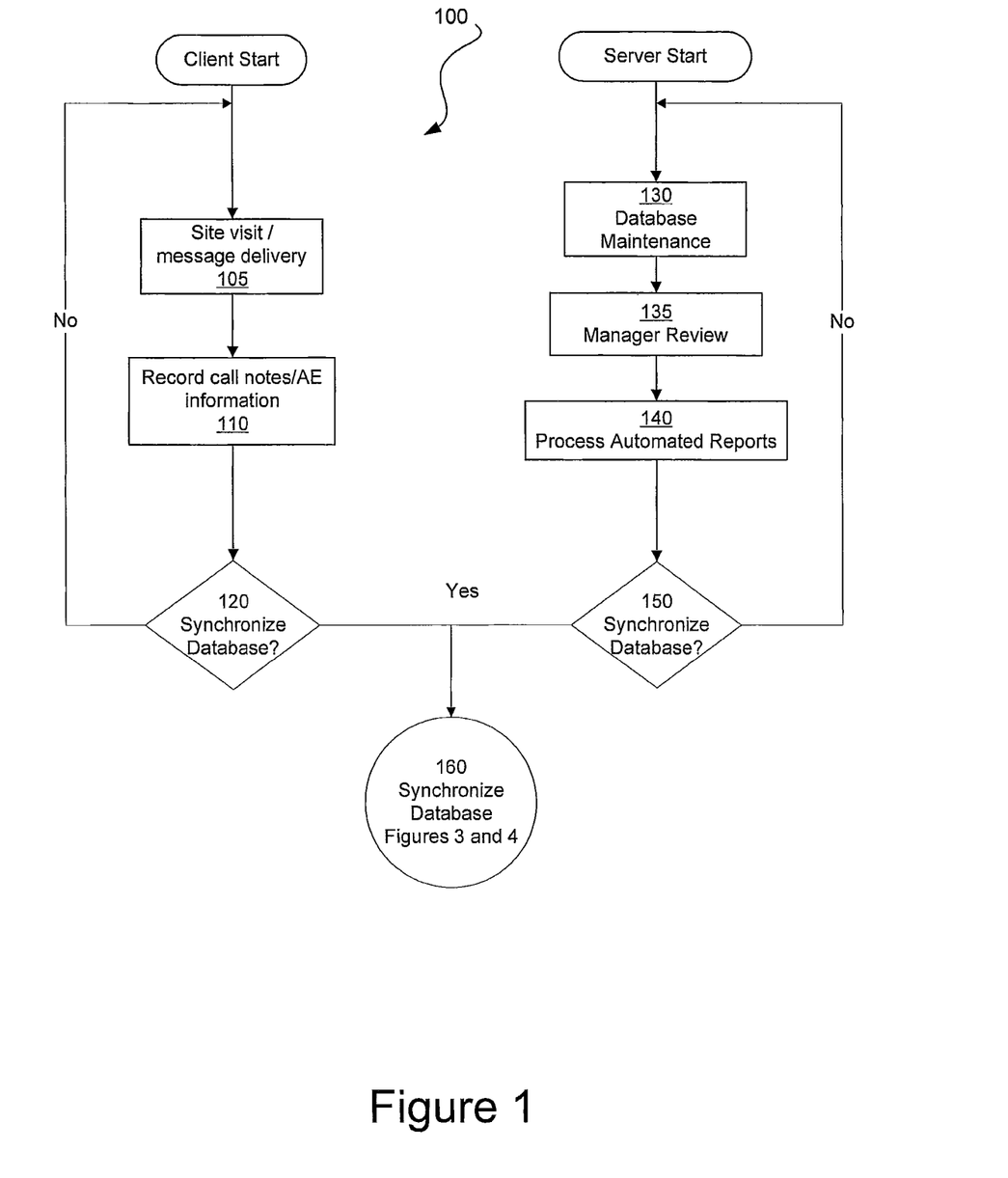
FIG. 1 is a flow diagram illustrating certain steps in accordance with an environment in which the present invention may used, wherein field representatives synchronize their data with information managed on a server.

The process 100 illustrated in FIG. 1 concerns activities relating to a pharmaceuticals representative. In the area of pharmaceutical representation, it is common for a representative to drop-in on a prescriber within the representative's assigned territory with the hope that the prescriber will be able to speak with the representative for a few minutes. The nature of such visits can vary from informal to formal, but one objective of the representative is to promote a prescriber's familiarity and understanding of pharmaceuticals that the representative wishes the prescriber to prescribe to patients. In other fields, the representative similarly has an objective of promoting purchase and use of his or her represented products and services through educational and promotional efforts. The process 100 includes activities by both a sales representative operating a client database (illustrated in the left branch of the flow diagram) and a database server (shown in the right branch). The activities of these persons, and data capture described below are brought together, in accordance with a salient aspect of the invention, to transmit and synchronize the data collected by the users with the server and redistribute relevant information back to the client databases.

Thus, at block 105, the representative makes a site visit to a particular prescriber's office. The representative typically makes a number of visits during the course of a day, whether scheduled or drop-in, and these visits can be coordinated through a calendar function provided by the same programmed system that handles the representative's reporting of any expense information. The scheduling and calendar functions form no part of the present invention, but are described in co-pending U.S. Provisional Application Ser. No. 60/868,015, filed on Nov. 30, 2006, entitled "Cycle Planning Tool for Territory Management" and U.S. Provisional Application Ser. No. 60/868,027, filed on Nov. 30, 2006, entitled "Itinerary Search Tool for Territory Management," which are each hereby incorporated by reference in their respective entireties.

It may be that the prescriber is not available for a conference with the representative, in which case the representative proceeds to a next appointment by traveling to another site within his or her territory, preferably with guidance from a calendared set of appointments that fill the day. If, however, a conference is held with a prescriber at a particular site visit, then the representative is supposed to capture a summary of who was met, what products (services) were discussed, whether samples were provided (and details concerning same), whether any adverse event information was discussed, propose a next meeting and follow-up discussion points, and document any expenses attributable to any prescribers that were visited. This information is captured in a "call note," which, upon entry into his or her machine, is a "call completion" concerning a sales call made at a given date and time. Functionality, systems and methodologies suited to adverse-event data capture, management and reporting are described in co-pending U.S. Provisional Application Ser. No. 60/867,923, filed on Nov. 30, 2006, entitled "Adverse Event Data Capture Software, Systems, And Methodologies" ("AE Capture"), which is hereby incorporated by reference in its entirety. Functionality, systems and methodologies suited to expense capture are described in co-pending U.S. Provisional Application Ser. No. 60/867,906, filed Nov. 30, 2006, entitled "Pharmaceutical Representative Expense Report Management Software, Systems, And Methodologies," which is hereby incorporated by reference in its entirety. All of this information must ultimately be synchronized with the central database.

Representatives generally seek to satisfy any concerns expressed by the customers in their territory, and so follow-up points can be captured in the territory management software so that the representative can better address those concerns with their customers. Representatives also have obligations to the company they represent to document any expenses attributable to visits to their customers and any adverse events that may have been reported for investigation or follow-up. Again, this information ultimately must be synchronized with the central database.

Use of the territory management system commences then at block 110 at which the representative initiates the entry of visitation notes, known as making a "call completion" because he or she has completed a sales call to the prescriber/customer and has meeting notes to record. The user can initiate this data entry process in a variety of ways. For example, a calendar feature of the management system can present an icon such as a telephone icon for selection which causes a call-notes entry form to be displayed. Alternatively, the calendar feature of the management system can include entries showing the time, location, or both, of the visits for that day which the representative can select to bring up the call-notes entry form. Yet another alternative is that the representative can call up a prescriber summary page which can include a link (or an icon as mentioned above) to enter call notes that are to be associated with that prescriber visit. These features are described in the aforementioned A/E Capture disclosure, and are not described further herein.

At block 110, the user inputs call notes and any adverse information using a suitable data entry form, such as the call-notes entry form described in the aforementioned AE Capture disclosure, which is recorded into the local database on the user's machine.

At step 120, the determination is made whether the database should be synchronized with the server. Synchronization can be initiated in multiple ways. For example, the user can instruct the client computer to synchronize with the database server, synchronization can be scheduled for a particular time or after a specified time interval, or the client database can determine that the certain one or more synchronization criterion have been met, such as a period of inactivity or network connectivity.

If synchronization is not appropriate at 120, the user and the client return to step 105, conceptually, to continue the process of visiting sites. However, if synchronization is initiated, the client proceeds to step 160, identifying the process illustrated in FIGS. 3 and 4.

While the user is conducting site visits 105 and recording call notes, any adverse event information 110, and other relevant information, the database server can perform maintenance and administrative tasks. For example, database maintenance 130 can include consistency checks, backups, and can re-compute database indices. Additionally, at block 135, manager review of the database can be performed through user interaction or automated algorithmic program code. Additionally, automated reports can be processed at step 140.

At step 150, the database server can receive a request to synchronize with a client database. If no synchronization request is received, the database server continues to perform its administrative tasks as necessary (e.g., steps 130, 135, and 145.) However, if a synchronization request is received, the server proceeds to step 160, identifying the process illustrated in FIGS. 3 and 4.

Figure 2:
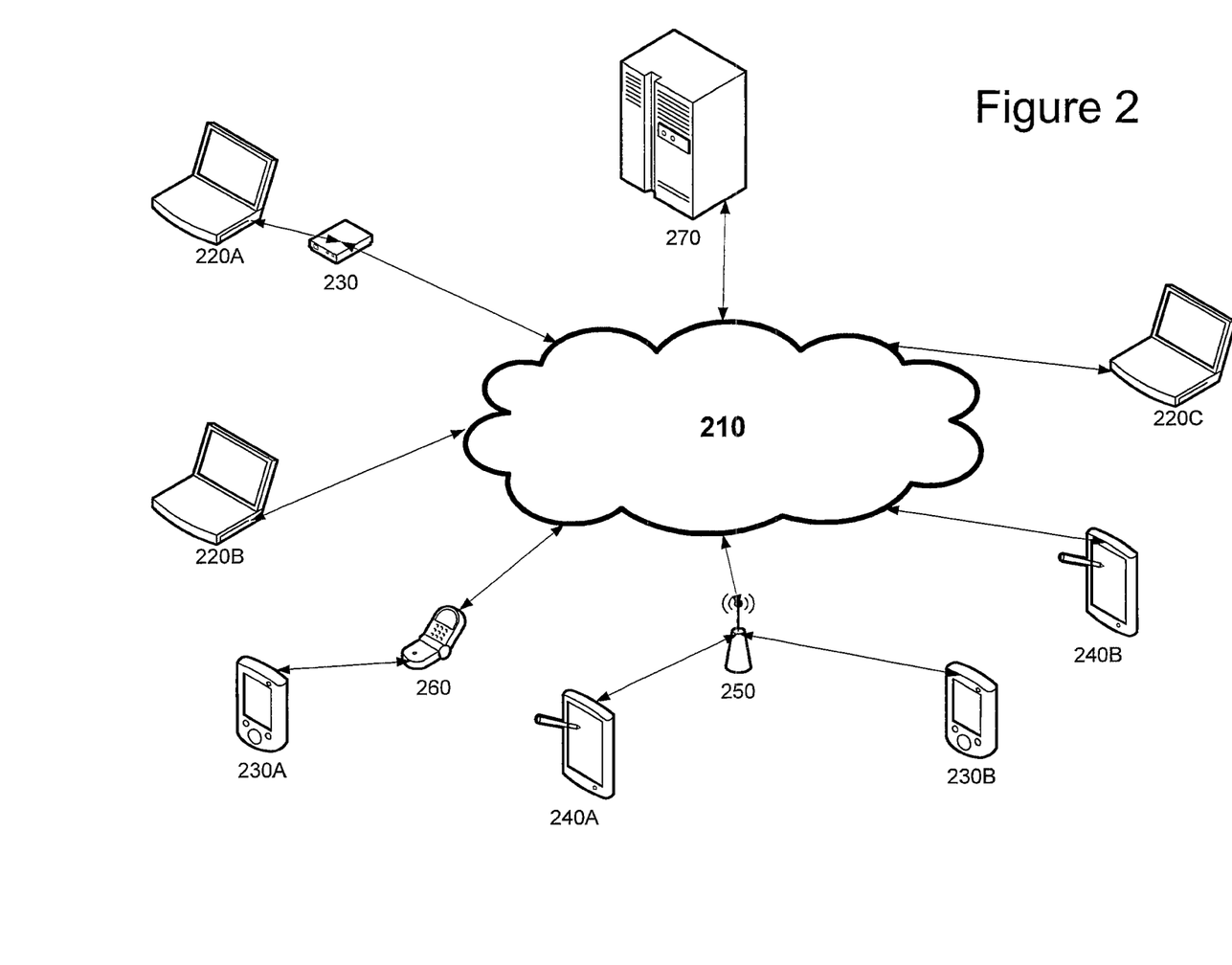
FIG. 2 is illustrates a network environment in which a system implementing an embodiment of the invention can be used.

Database synchronization can be conducted over a heterogeneous network 210 as illustrated in FIG. 2. Multiple clients can connect to server 270 over the network 210 using various means of communication. For example, a laptop 220A can connect to a modem 230 to access the database server 270. Alternatively, laptop 220B can connect to the network over an Ethernet or other broadband connection.

Additionally, a variety of wireless networks can be utilized to facilitate client-server communications and database synchronization. Laptop 220C and tablet PC 240B can connect via an internal cellular modem or PC Card cellular modem. Tablet PC 240A or Personal Digital Assistant (PDA) 230B can connect to a wireless access point 250 to communicate with server 270. Alternatively, PDA 230A can connect using a wireless standard such as Bluetooth or via a wired link to a cellphone 260 that can communicate over the network 210 with the server 270.

The present invention can be implemented over a client server network as well as a peer-to-peer network. If operated over a peer-to-peer network, multiple databases at each respective client can be synchronized and updated to account for the data input or modified on the peer clients. However, for the purposes of expediency, in the below discussion, each actor in a network transaction is referred to as a client or a server.

Additionally, it should be noted that FIG. 2 illustrates clients as devices conventionally associated with client-type operations and performance (e.g., laptops, tablet computers, etc.). However, a client can include other communication devices and combinations thereof. For example, a client can be separated into a thin element (e.g., a personal digital assistant (PDA) that acts only as a display) that communicates with a workstation element (e.g., a laptop or other portable computer). Through a configuration such as the one described, a field representative can carry the PDA into a customer's and enter the information on the PDA, which is communicated to the portable computer located in the field representative's car. Alternatively, a computerized medical device can also act as a client that synchronizes its data with a server.

Each type of connection (e.g., modem, cellular network, broadband, etc. . . . ) and device has its own connection characteristics, such as speed, availability, and reliability. The database synchronization set forth by the present invention can function over these types of communication links and communication devices, as well as many others.

Figure 3:
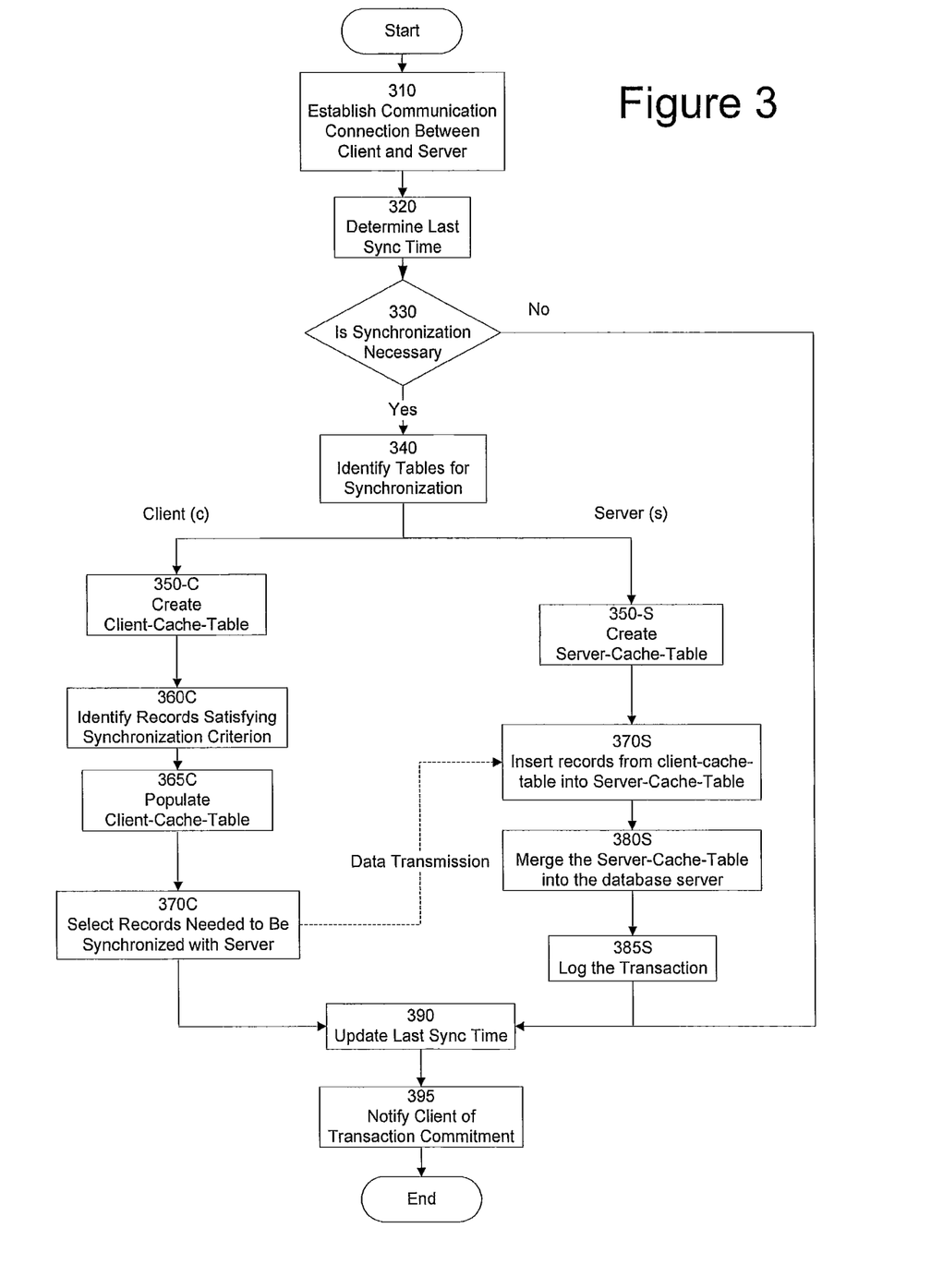
FIG. 3 is a flow diagram illustrating certain steps in accordance with a preferred embodiment of the present invention in which data on a client is synchronized with a database server.
Figure 4:
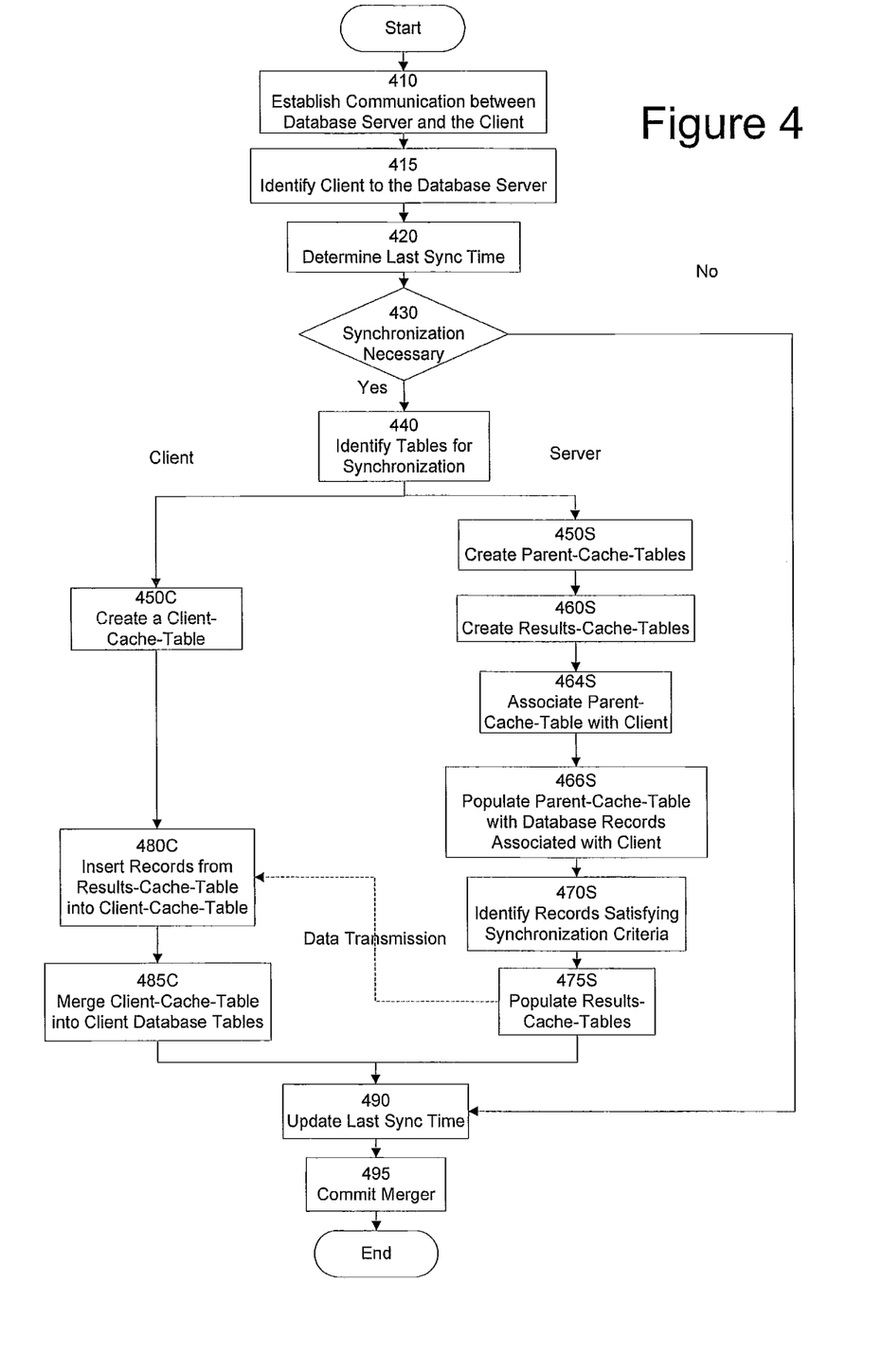
FIG. 4 is a flow diagram illustrating certain steps in accordance with a preferred embodiment of the present invention in which data on a server is synchronized with a client database.

The process of database synchronization is illustrated in FIGS. 3 and 4. FIG. 3 illustrates a process in accordance with an embodiment of the present invention by which data that has been added or modified on the client is transmitted to the server 270. FIG. 4 illustrates a process in accordance with an embodiment of the present invention by which information is distributed from the server 270 to the client. Synchronization to or from the server 270 can occur in any order (i.e., the process of uploading information to the server 270 can occur before or after download information from the server 270). Moreover, the upload and download can occur simultaneously to the extent database consistency and associated data locks allow.

With reference now to FIG. 3, the process 300 illustrates the exchange of data from the client to the server. At step 310 a communication connection between the client and the server is established. Either the client or the server can initiate the communication connection. However, because clients typically have intermittent connectivity and can change network addresses frequently, the connection is preferably initiated by the client.

The connection is preferably a database link, such as that provided by the Oracle database. The database link allows for the execution of SQL or other standard database language instructions to operate on remote databases. Thus, for example, the database link allows the client to "INSERT" a record on the database server. Other protocols and languages, known in the art, that provide similar functionality can be used as well.

Preferably, the client and server communicate to determine the last synchronization ("sync") time between the two machines at step 320. Determining the last sync time can further reduce the overhead and processing required for synchronization by eliminating any records that have not been modified or added since the last sync time. However, if desired a full synchronization can be executed. Full synchronization can be useful if one of the databases has been corrupted. The uncorrupted database can synchronize and overwrite the corrupted records of the database even if the system indicates the records were previously synchronized.

The last sync time can be maintained by the client or the server. If the client stores the last sync time, the client can log the date and time of the most recent synchronization and provide the time to the server or respond with the time at the request of the server. Alternatively, the server can maintain a record of each client and the last times the client synchronized with the database server and, thereby, provide the last sync time to the client in a similar manner. Optionally, both the server and client can maintain a record of the last sync time and exchange that time. If there is a discrepancy, the earlier time is preferably utilized as the last sync time. Using the earlier sync time can result in possible redundancy of data. However, this redundancy can be accounted for and eliminated on the machine receiving the data by determining the data is already in the database. Utilizing the earlier sync time prevents data from being incorrectly excluded from a synchronization transaction.

Once the last sync time is determined a determination can be made as to whether synchronization is necessary at step 330. If neither the client nor the server has modified any database records since the last sync time, then database synchronization is not necessary, and the client and server can proceed to step 390 and update the last sync time.

However, if synchronization is necessary, the client and server can optionally communicate to determine which tables are necessary to synchronize at step 340. This determination can include several factors. For example, certain tables on the server can be server-specific and therefore, not necessary for the client to perform its function and even pose potential security risks if the information stored therein were transmitted to the client. Additionally, certain data may be scheduled for synchronization on a periodic basis that is less frequent than every synchronization transaction.

After the last sync time, and optionally after synchronization tables have been identified, the client and server can execute several steps of the synchronization process in parallel and independently for more efficient processing. FIG. 3 illustrates the steps executed on the client with the suffix "C" on the left-side of the process-flow and steps executed on the server with the suffix "S" on the right-side of the process-flow.

At step 350C, the client creates a client-cache-table to store the records, or copies of the records, that are to be synchronized with the database server. Client-cache-tables can comprise traditional (permanent) database tables that are populated and cleared for each synchronization session. Alternatively, client-cache-tables can be a file or data-structure stored in the computer's memory. However, the client-cache-table preferably comprises a temporary table. Temporary tables are designed to hold session-private data that exists only for the duration of a transaction or session. Furthermore, data locks are not required for the data of the temporary tables because each session has its own private data. A client-cache-table is preferably created for each table that is identified as requiring synchronization. The client-cache-tables to be created are in response to the determination at step 340.

The client data records that satisfy synchronization criteria are identified at step 360C. Synchronization criteria can include one or more test or rule. Preferably, one such synchronization criterion identifies the data record as being modified, added, or deleted after the last sync time. Synchronization criteria can also include the type of data, the owner of the data, or the priority of the data. The data records satisfying the synchronization criteria are then populated in the client-cache-table at step 370C.

The server can prepare to receive the data records from the client, while the client is preparing its client-cache-table 350C, identifying the records to be synchronized 360C, and populating the client-cache-table with those records 370C. At step 350S, the server creates a server-cache-table in response to the determination at step 340 to receive and store the synchronization records from the client. A server-cache-table is preferably created for each table that is identified as requiring synchronization.

Creating client-cache-tables and server-cache-tables on the client and server, respectively, isolates the main client and/or database server tables from the network database transactions. In doing so, the database query optimizer can make better decisions regarding how to transfer the data from the client to the server, or vice versa. Furthermore, the creation of cache tables reduces the amount of data that must be processed by the client and/or the server and be transmitted over the network. These, and other factors, can increase performance as the size of the dataset stored in the client database and/or server increases, as the number of clients increases, and as bandwidth of the network or processing power of the client and/or server decreases, among other computing environmental conditions.

Thus, once the cache tables on the client and server have been created and the client-cache-table populated, the client and server can efficiently perform the transfer of unsynchronized data. At step 370C the records stored in the client-cache-table that are to be synchronized with the server are selected, and at step 380S, the records are inserted into the server-cache-table after being transmitted over the network (Data Transmission). Preferably, the selection and insertion of data are executed through a standard database language command, such as a SQL command, and transmitted over a database link.

Once the client data records from the client-cache-table have been inserted into the server-cache-table at step 370S, the server-cache-table can be merged into the tables of the database server at step 380S. The merge process can be executed through a merge-command defined by the database language of the system. The merger can insert, or create, new records, update existing records, and delete existing records. A records can be deleted by marking a particular field of the record as null. The null field can be used to indicate the deletion. Alternatively, if the null field is in records in the cache-table, it can be used instruct the database server to delete the record from the database when the merge is performed.

Optionally, the merge process can identify duplicate records, and correctly ignore or accept the duplicate records. Duplicate records can result from various conditions. For example, duplicate records can result if the last sync time is incorrect due to a disconnection of a synchronization session prior to updating the last sync time (step 390) and after the merge step at 380S.

The synchronization transaction is preferably logged at step 385S. Logging the transaction allows for auditing if an error occurs. Additionally, a log can be used to "replay" the transactions to recreate a database if there is an error or lost data.

Preferably, the client is notified at step 390 that the transaction has completed and been logged. This notification can be implicit in the database link transaction that selects the client-cache-table data records and inserts the records into the server-cache-table. However, additional notification of completion can be transmitted as an additional verification or to confirm with non-database application layer software that the synchronization is complete, e.g., as an e-mail or other electronic message to the client.

The last sync time is update at step 390. As discussed above, the last sync time can be stored on the client, the server, or both. Preferably, the sync time is the time the data was copied from the client tables to the client-cache-table. Thus, any data records that are modified or created on the client during synchronization will be timestamped after the last sync time and therefore synchronized during the next transaction.

The cache-tables are preferably cleared one the transaction is complete. Some database implementations automatically clear temporary tables once the particular session associated with the cache-tables is closed. Alternatively, the system can purposefully clear the cache table after the transaction has been committed or if the communication connection is lost prior to committing the transaction.

The foregoing discussion focuses synchronizing on data from the client to the server, and discusses the mechanisms used to efficiently effect the synchronization. Similar mechanisms can be utilized to synchronize data from the server to the client. The following discussion describes the process of synchronizing server data to the client as illustrated in FIG. 4.

As discussed with respect to FIG. 3, a communication connection, preferably a database link, is established between the client and database server at step 410. The client preferably identifies itself to the database server at 415. Identification can occur through various processes such as transmitting an ID to the database server, a challenge response, or by cryptographically signing messages to the database server and authenticating the signature.

The last sync time is determined at step 420. The server can determine the last sync time utilizing the identification of the client determined at 415. Alternatively, the last sync time can be determined in any of the ways discussed above with respect to step 315. Further, the determination of whether synchronization is made at step 430. When synchronization is not necessary, the last sync time is updated at step 490. However, if synchronization is required, the client and server preferably determine and identify the database server tables necessary to examine during synchronization.

As discussed above, the client and database server can execute various steps of the synchronization process in parallel and independently for more efficient processing. FIG. 4 illustrates the steps executed on the client with the suffix "C" on the left-side of the process-flow and steps executed on the server with the suffix "S" on the right-side of the process-flow.

In this scenario, data is being transferred from the server to the client, rather than client to server as described with respect to FIG. 3. Therefore, in FIG. 4, the client performs similar steps as those performed by the server in FIG. 3 in preparation for receiving the data to be synchronized. At step 450C, the client creates client-cache-tables, preferably for each of the tables being synchronized, in response to the determination at step 440.

On the server, cached data can be utilized in multiple ways to increase the speed and efficiency of synchronization of data from the server to the client. At 460S, the server creates a results-cache-table, also in response to the determination at step 440, that stores the data to be synchronized with the client during the database link transaction. In accordance with one embodiment of the present invention, the server can mirror the steps of the client during the synchronization of data from the client to the server by proceeding to identify the data records satisfying the synchronization criteria at 470S, and populating the results-cache-table with those data records at step 475S. The data records stored in the results-cache-table are then selected and inserted into the client-cache-table on the client at step 480.

Alternatively, the server can further optimize synchronization by employing additional cache tables. For example, as illustrated in FIG. 4, the server can create one or more parent-cache-tables at step 450S, each having child tables storing other information relevant to the client. Parent-cache-tables can be used to create smaller, more efficient tables on which to operate and execute database queries. When a database table stores millions of records for hundreds of clients, operations concerning a specific client still require searches over the millions of records. In the scenario described above, in which the queries are known to be limited to a specific client, a parent-cache-table can be created for each parent table at 450S, associated with the specific client at 464S, and populated with only the records pertaining the identified client at 466S, thereby greatly reducing the computation required to execute the queries. The step of associating the parent-cache-table with the identified client at 464S is preferably accomplished by the infrastructure of the database server, for example through the use of temporary tables in which the temporary-patent-cache-table can be associated with a specific client session automatically by the database server.

If parent-cache-tables are utilized to prepare the data synchronization with the client, the identification of records satisfying the search criteria at step 470S can be performed over the set of parent-cache-tables, child tables, and, optionally or selectively, any database tables for which parent-cache-tables have not been created.

The synchronization criteria used to identify data records for server-to-client synchronization can be similar to those of client-to-server synchronization. Additionally, synchronization criteria can be used to assist in re-aligning the data for which each client is responsible. The processes, systems, and methodologies of re-aligning data responsibility and/or ownership form no part of the present invention, but are described in co-pending U.S. Provisional Application Ser. No. 60/867, 945, filed on Nov. 30, 2006, entitled "Software, Systems and Methodologies For Realignment of Remote Databases By A Central Database In Support of Field Representative Territory Assignments," which is each hereby incorporated by reference in its entirety.

Once the results-cache-table has been populated with the data records identified as satisfying the search criteria at step 475S, the results-cache-table records can be inserted into the client-cache-table on the client at step 480. The client-cache-table can then be merged in the client database at step 485, and the last sync time updated on the client and/or server 490. The merger and synchronization can be committed at step 495.

Note that while the above discussion references client-to-server synchronization and server-to-client synchronization as two separate processes, the steps involved are very similar, and in some cases can mirror each other. Additionally, synchronization in both directions can be performed simultaneously, thereby reducing much of the processing and overhead required for synchronization. For example, establishing a communication channel between the server and the client, steps 310 and 410, is only required once. Additionally, the last sync time determined in steps 320 and 420 can be determined once and used to synchronize in both directions. However, it can be beneficial to store two synchronization times, one for client-to-server synchronization, and another for server-to-client synchronization. Similarly, the determination of whether synchronization is necessary (steps 330 and 430) and the identification of tables to be synchronized (steps 340 and 440) can be combined to determine the parameters for both synchronization directions.

Furthermore, in the foregoing description, certain flow diagrams have been shown and processes described in relation to those flow diagrams which provide a reference for discussion purposes. In an actual implementation of the methods of the present invention, the steps can comprise event-driven routines that can run in parallel and can be launched and executed other than as shown by the simple depiction in the flow diagrams. In short, the particular order of the steps in the flow diagrams is illustrative of the invention, but not limiting of the various permutations that can be achieved in a given embodiment. Accordingly, it is the performance of the steps recited in the claims appended below which is pertinent, and not the order of operation of the steps themselves.

While the invention has been described in connection with a certain embodiment thereof and in relation to a particular environment, the invention is not limited to the described embodiments and environments but rather is more broadly defined by the recitations in the claims below and equivalents thereof.

We claim:

1. A computer-assisted method for synchronizing records in a server database with a client database at a client which is configurable to have a client-cache-table with one or more fields corresponding to at least one field within the client database, comprising the steps of:
   establishing a communication connection between a server and the client, wherein the server and the client comprise respective machines;
   determining that a synchronization session is necessary with regard to one or more of the records;
   creating a server-cache-table on the server having one or more fields corresponding to at least one field in the server database in response to the determining step having determined that the synchronization session is necessary, wherein the server-cache-table is a temporary table designed to hold data for the synchronization session;
   populating the server-cache-table in accordance with a synchronization criterion using at least one database record within the server database, wherein the synchronization criterion comprises a test or rule applied to the at least one database record of the server database;
   transmitting the at least one database record from the populated server-cache-table to the client over a network using the communication connection to cause a synchronization in which the client-cache-table commits the transmitted at least one database record from the populated server-cache-table into the client database; and
   receiving a notification at the server database that the at least one database record has been committed to the client database.

2. The method of claim 1, wherein the server-cache-table comprises a temporary table.

3. The method of claim 1, wherein the test or rule comprising the synchronization criterion is satisfied in view of a type of data, an owner of the data, or a priority of the data included in the database records within the server database.

4. The method of claim 1, further comprising the step of determining a last sync time, wherein the test or rule comprising the synchronization criterion verifies that a modification status of the at least one database record has been modified since the last sync time.

5. The method of claim 4, wherein the last sync time is associated with the at least one field in the server database.

6. The method of claim 4, further comprising the step of retrieving the last sync time from the server for the client.

7. The method of claim 1, further comprising the step of identifying a set of relevant tables, wherein the test or rule comprising the synchronization criterion verifies the at least one database record is included in the set of relevant tables.

8. The method of claim 1, wherein the communication connection includes a database link.

9. The method of claim 1, further comprising the step of updating a last sync time.

10. The method of claim 1, wherein the committing step includes the step of updating a record status to indicate that the record has been deleted.

11. A computer-based system for synchronizing records within a client database to a current status of a server database, comprising:
   a server comprising a computer, wherein the server database is associated with the server;
   a communication connection that is connectable over a network from the server to the client database;
   wherein the server is configured to:
      be in a synchronization session, wherein the synchronization session is established by either the server or the client over the communication connection;
      create a server-cache-table having a structure compatible with the client database for use in the synchronization session, wherein the server-cache-table is a temporary table designed to hold data for the synchronization session;
      populate the server-cache table with at least one database record from the server database in accordance with a synchronization criterion applied to the at least one database record of the server database, wherein the synchronization criterion comprises a test or rule applied to the at least one database record of the server database;
      transmit through the communication connection the at least one database record from the populated server-cache table to the client database; and
      receive a notification at the server database that the at least one database record has been committed to the client database,
   whereby the client database is synchronized to the current status of the server database.

12. The computer-based system of claim 11, wherein the server-cache-table comprises a temporary table.

13. The computer-based system of claim 11, wherein the test or rule comprising the synchronization criterion is satisfied in view of a type of data, an owner of the data, or a priority of the data included in the database records within the server database.

14. The computer-based system of claim 11, wherein there are a plurality of client databases and wherein the server is configured to determine a last sync time with the client database among the plurality of client databases, wherein the test or rule comprising the synchronization criterion verifies that a modification status of the at least one database record has been modified since the last sync time with the client database.

15. The computer-based system of claim 14, wherein the server is further configured to update the last sync time.

16. The computer-based system of claim 11, wherein the server is further configured to clear the server-cache-table after the notification.

\* \* \* \* \*